(No Model.)

T. W. DUFFY.
EXPANSION JOINT.

No. 282,967. Patented Aug. 14, 1883.

Witnesses:
C. G. Keyes
B. Marvin Fernald

Inventor:
Thomas Wm Duffy
by A. H. Spencer
his attorney

UNITED STATES PATENT OFFICE.

THOMAS W. DUFFY, OF BOSTON, MASSACHUSETTS, ASSIGNOR TO THE NEW YORK STEAM COMPANY OF NEW YORK, N. Y.

EXPANSION-JOINT.

SPECIFICATION forming part of Letters Patent No. 282,967, dated August 14, 1883.

Application filed December 4, 1882. (No model.)

*To all whom it may concern:*

Be it known that I, THOMAS WILLIAM DUFFY, a subject of the Queen of Great Britain, residing at present in Boston, in the county of Suffolk and State of Massachusetts, have invented certain new and useful Improvements in Expansion-Joints; and I do hereby declare that the same are fully described in the following specification and illustrated in the accompanying drawings.

The object of this invention is to secure an expansion-joint adapted to great extremes of heat and cold, and having the qualities of cheapness of construction and of strength and permanence in use.

My invention consists in a spirally-corrugated sheet-metal tube, in combination with an outwardly-flanged metallic collar, similarly corrugated internally, surrounding and secured to each end of said tube, said flanges being adapted to be bolted to similar flanges on other tubes, with interposed packing.

My invention also consists in the further combinations of devices set forth in the appended claims.

Figure 1:
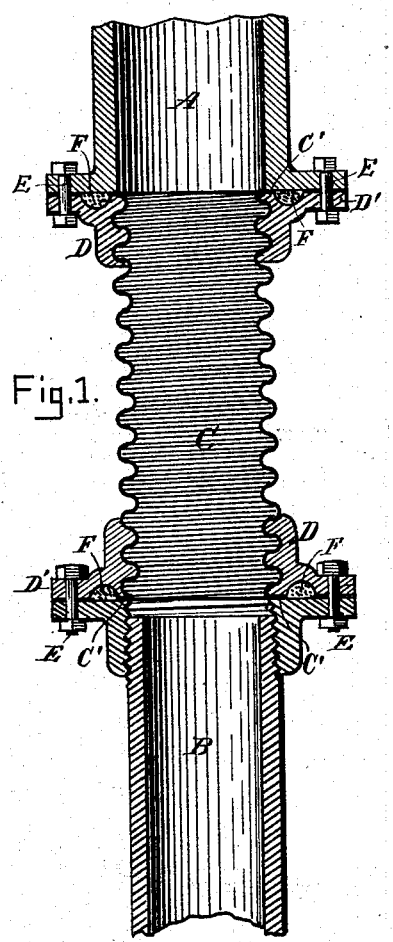
Figure 2:
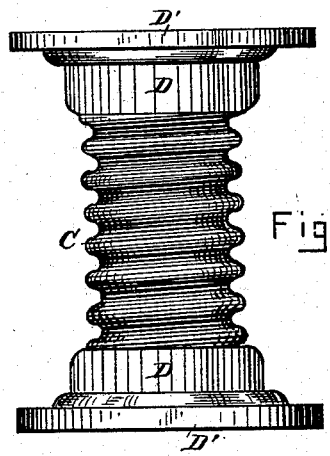

In the drawings, Figure 1 is a longitudinal section of a joint embodying my invention, and Fig. 2 is an external view of the corrugated tube and its collars.

The characteristic peculiarity of my improvement is clearly shown in the drawings. The rigid pipes A and B have a yielding connection with each other through the corrugated wrought-metal tube C, to which the collars D are secured, and these collars have radial flanges D', with bolt-holes to receive bolts E, by which they are made fast to the flanges of the pipes A and B, with rings of packing F interposed between them.

The form of collars best shown in Fig. 1 is original with me and has special advantages. The internal surface is corrugated spirally like the tube C, that the latter may fit snugly within the collars, and thus have an extended and most intimate surface contact, and be readily placed in position by screwing the parts together, and subsequently expanding the tube ends to fit accurately the corrugations within the collars.

To still further insure a steam-tight joint, the extreme outer ends of the sheet-metal tube may be flared outwardly or faced upon the flanges D' of the collars, as at C', so as to nip the part C' between two adjacent collars when they are bolted together.

In order to retain the packing-rings F in place and avoid leakage due to careless workmanship, I form in the external faces of the flanges D' of the collar annular grooves adapted to receive the rings F and hold them when compressed by the bolts E against the flat flanges of the rigid pipes A and B. These latter flanges may, as shown in Fig. 1, be formed integral with said pipes or be screwed upon them.

I claim as my invention—

1. A transversely-corrugated sheet-metal tube, in combination with flanged metallic collars, similarly corrugated internally, surrounding and made fast to the ends of said tube, and adapted to be secured to similar flanges on other tubes, substantially as set forth.

2. A sheet-metal tube corrugated spirally, in combination with flanged and spirally-grooved collars applied to the ends thereof by a screw action, said tube being expanded within said collars and faced upon their flanges, for the purpose set forth.

3. The rigid pipes A B, formed with radial flanges, in combination with the expansible means of connection, consisting in the corrugated tube C and collars D D', and the packing-rings F, held within grooves in the flanges of the collars, substantially as and for the purpose set forth.

In testimony whereof I hereto affix my signature in presence of two witnesses.

THOMAS WILLIAM DUFFY.

Witnesses:
A. H. SPENCER,
E. A. PHELPS.